(12) United States Patent
Park et al.

(10) Patent No.: US 9,158,446 B2
(45) Date of Patent: Oct. 13, 2015

(54) METHOD AND APPARATUS FOR INTERFACING

(75) Inventors: Chun-eon Park, Suwon-si (KR); Seok-jae Jeong, Suwon-si (KR); Sun-gi Hong, Seoul (KR); Du-il Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 413 days.

(21) Appl. No.: 13/224,928

(22) Filed: Sep. 2, 2011

(65) Prior Publication Data

US 2012/0056900 A1 Mar. 8, 2012

(30) Foreign Application Priority Data

Sep. 2, 2010 (KR) ........................ 10-2010-0086176

(51) Int. Cl.
*G06T 19/20* (2011.01)
*G06F 3/0488* (2013.01)
*G06F 3/0484* (2013.01)
*G06F 3/0481* (2013.01)
*G09G 3/00* (2006.01)

(52) U.S. Cl.
CPC .......... *G06F 3/0488* (2013.01); *G06F 3/04815* (2013.01); *G06T 19/20* (2013.01); *G06T 2219/2016* (2013.01); *G09G 3/003* (2013.01); *G09G 2340/0464* (2013.01)

(58) Field of Classification Search
CPC ......... G06T 13/00; G06T 13/80; G06T 13/20; G06T 19/00; G06T 19/20; G06F 3/0484; G06F 3/0486; G06F 3/04845; G06F 3/0488; G09G 2340/0464; G09G 3/003

USPC ................ 345/619, 660, 661, 649, 650, 473; 715/834, 810; 463/9
See application file for complete search history.

(56) References Cited

U.S. PATENT DOCUMENTS

| | | | | |
|---|---|---|---|---|
| 5,748,192 A | * | 5/1998 | Lindholm ...................... | 345/649 |
| 8,060,840 B2 | * | 11/2011 | Billow et al. ................. | 715/834 |
| 8,253,761 B2 | * | 8/2012 | Kim et al. ..................... | 345/650 |
| 8,502,817 B2 | * | 8/2013 | Deb et al. ...................... | 345/419 |
| 8,542,238 B2 | * | 9/2013 | Niles et al. .................... | 345/473 |
| 8,549,432 B2 | * | 10/2013 | Warner ......................... | 715/834 |
| 2007/0097114 A1 | | 5/2007 | Kim et al. | |
| 2007/0159497 A1 | * | 7/2007 | Gur et al. ...................... | 345/650 |

(Continued)

FOREIGN PATENT DOCUMENTS

| | | |
|---|---|---|
| CN | 1955901 | 5/2007 |
| CN | 101510141 | 8/2009 |
| KR | 1020100055781 | 5/2010 |

OTHER PUBLICATIONS

Darwin Payne, "Computer Scenographics", p. 145-147, 1994.*

(Continued)

*Primary Examiner* — Chante Harrison
(74) *Attorney, Agent, or Firm* — The Farrell Law Firm, P.C.

(57) ABSTRACT

A method and apparatus for interfacing includes outputting at least one object to a display embodying a three-dimensional space and determining a radius of rotation of the at least one object, based on a distance between the at least one object and a rotation axis in the three-dimensional space. The method and apparatus further include controlling the at least one object to rotate around the rotation axis based on the radius of rotation when a rotation command for the at least one object is received.

9 Claims, 14 Drawing Sheets

(56) References Cited

U.S. PATENT DOCUMENTS

| | | |
|---|---|---|
| 2007/0164989 A1* | 7/2007 | Rochford et al. ............ 345/156 |
| 2008/0165141 A1 | 7/2008 | Christie |
| 2009/0303231 A1 | 12/2009 | Robinet et al. |
| 2009/0322695 A1 | 12/2009 | Cho et al. |
| 2010/0016049 A1* | 1/2010 | Shirakawa et al. ............... 463/9 |
| 2010/0020026 A1* | 1/2010 | Benko et al. .................. 345/173 |
| 2010/0093400 A1 | 4/2010 | Ju et al. |
| 2011/0102463 A1* | 5/2011 | Kaski et al. .................. 345/649 |
| 2012/0050788 A1* | 3/2012 | Bachman et al. ............. 345/635 |
| 2012/0162265 A1* | 6/2012 | Heinrich et al. ............. 345/661 |
| 2012/0280997 A1* | 11/2012 | Reese et al. .................. 345/426 |

OTHER PUBLICATIONS

Australian Office Action dated Nov. 18, 2013 issued in counterpart application No. 2011296686.

Chinese Office Action dated Jun. 2, 2015 issued in counterpart application No. 201180042332.0.

\* cited by examiner

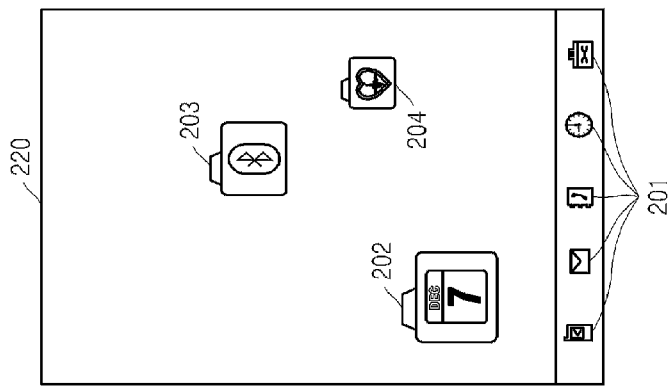
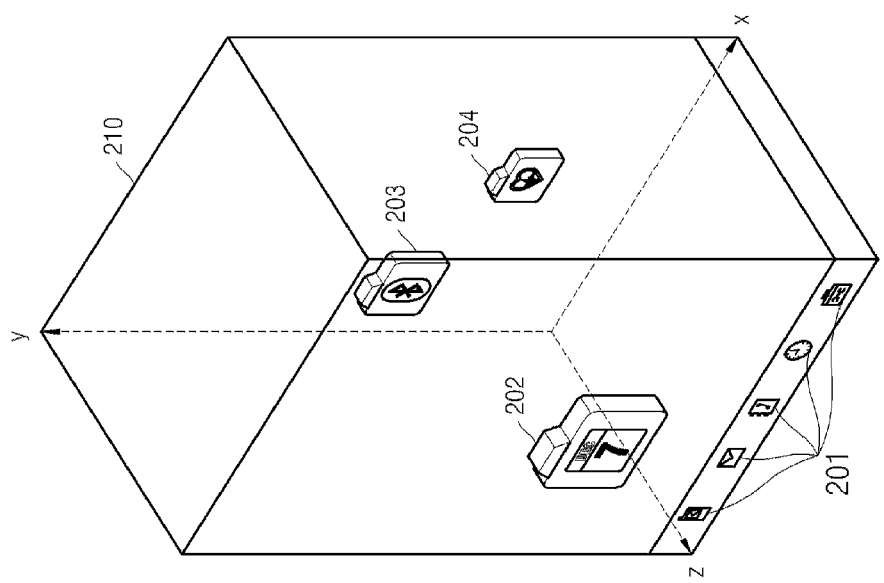

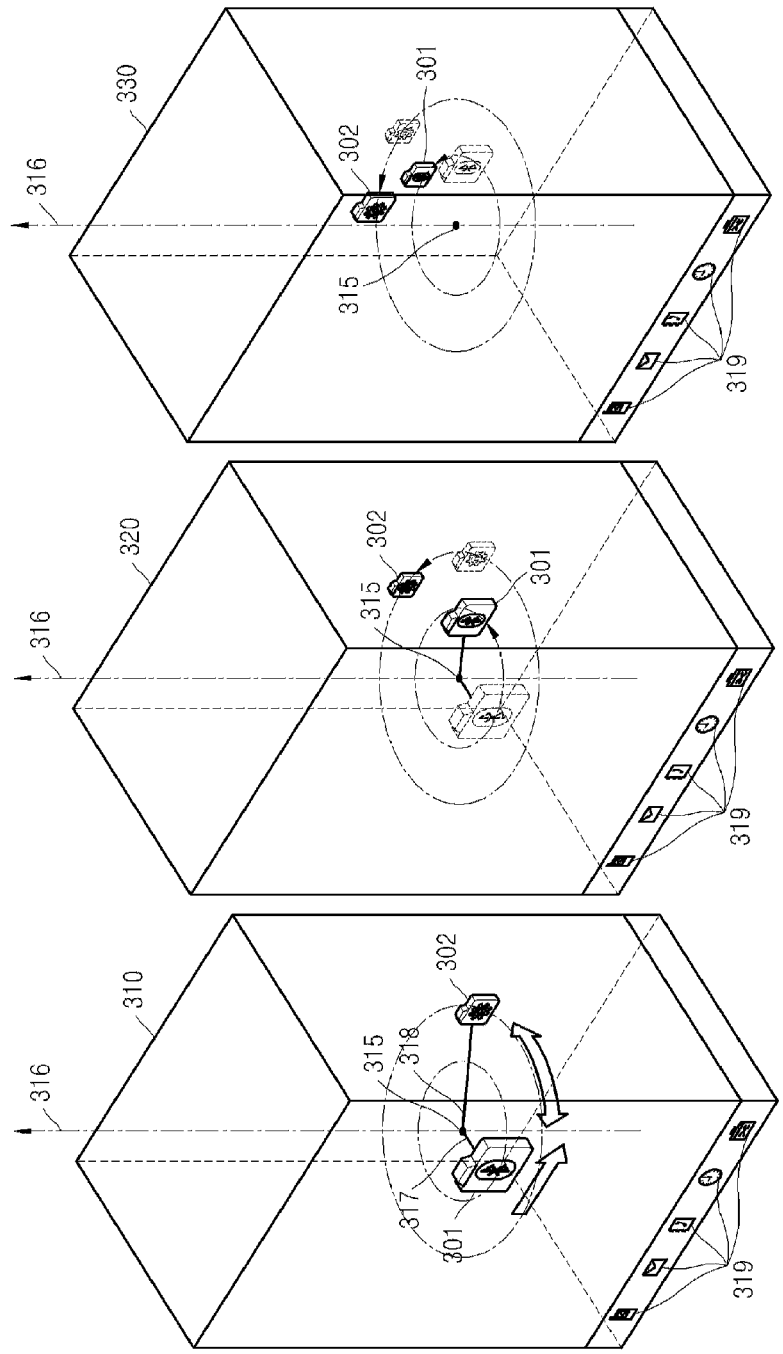

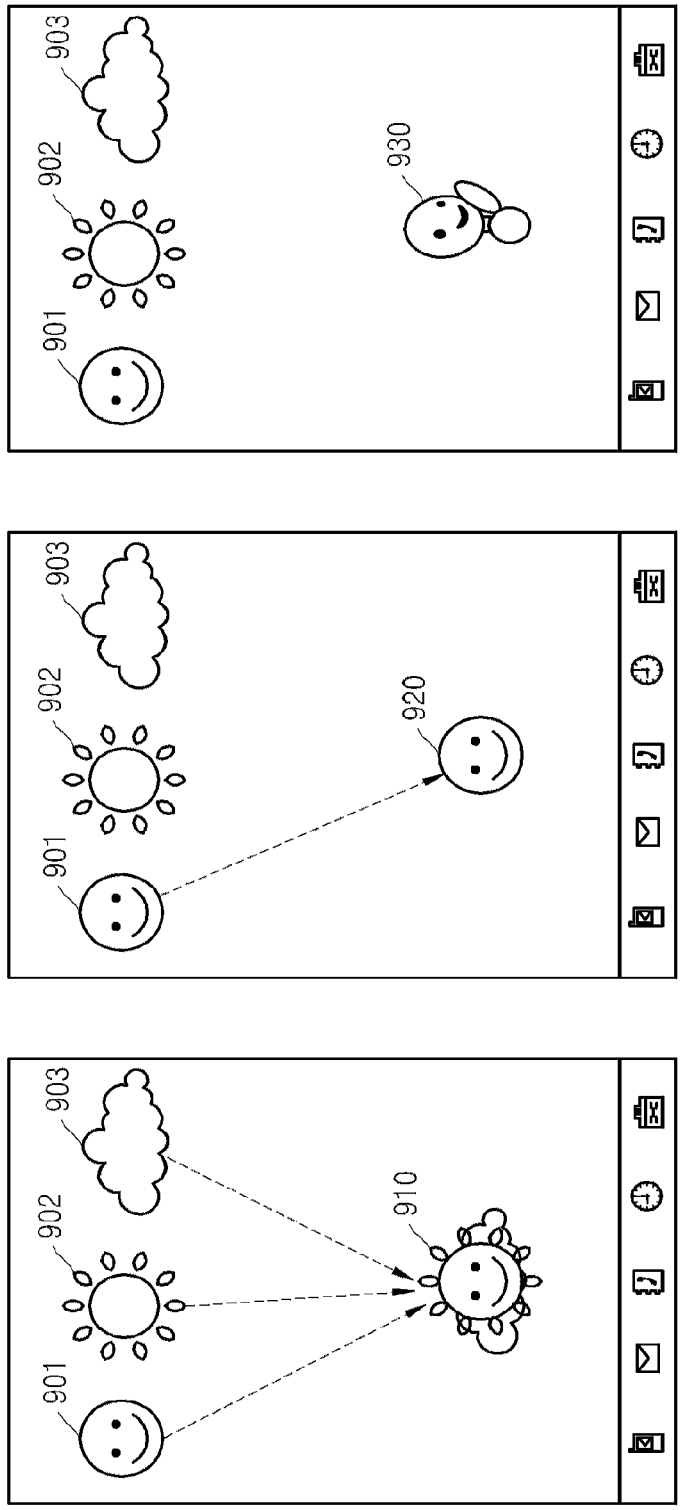

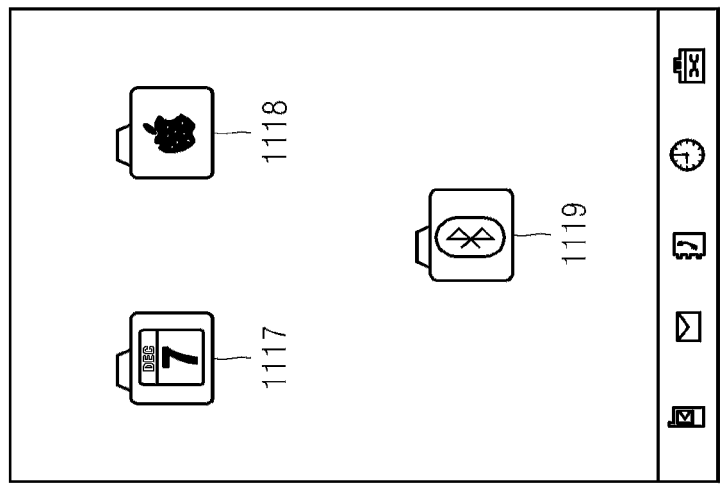
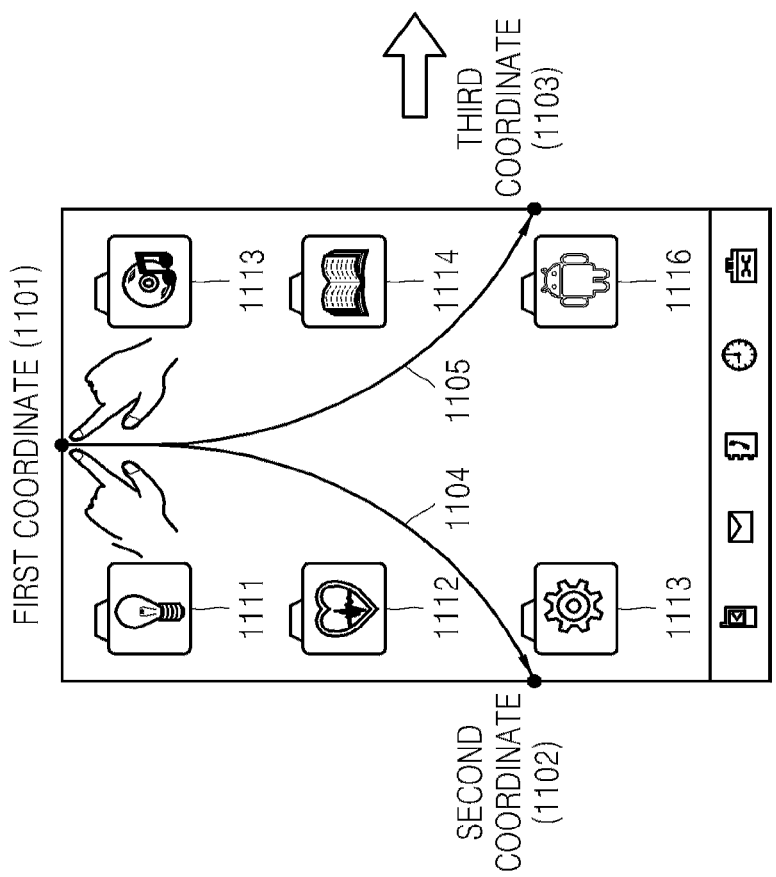

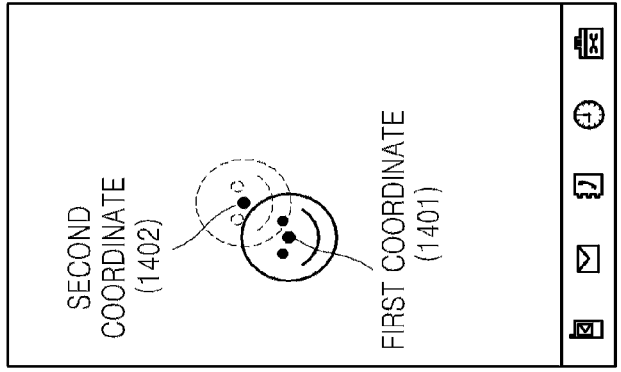
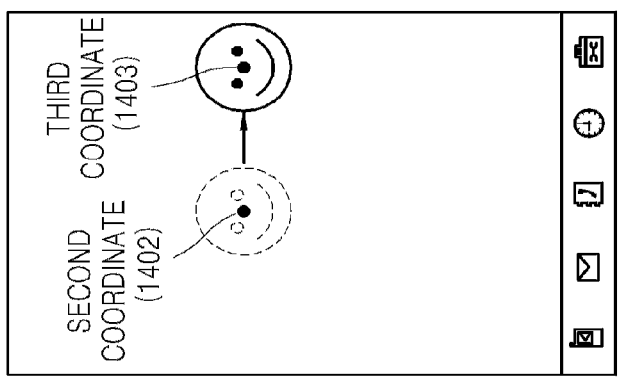
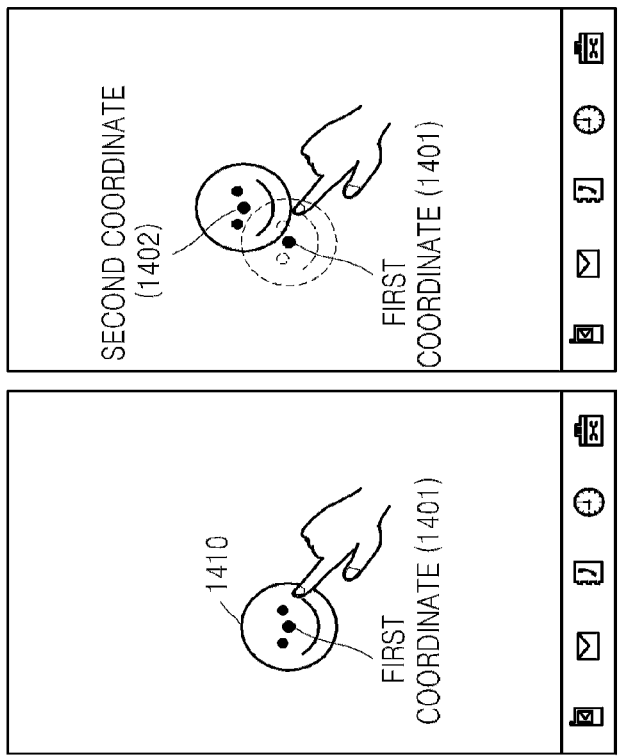

METHOD AND APPARATUS FOR INTERFACING

PRIORITY

This application claims priority under 35 U.S.C. §119(a) to Korean Patent Application No. 10-2010-0086176, filed on Sep. 2, 2010, in the Korean Intellectual Property Office, the entire disclosure of which is incorporated herein by reference.

BACKGROUND OF THE INVENTION

1. Field of the Invention

The present invention relates generally to a method and an apparatus for interfacing, and more particularly, to a method and an apparatus for interfacing, which supports rotation of objects in a three-dimensional space.

2. Description of the Related Art

In the conventional art, icons are generally shown on a display representing a two-dimensional space and are moved in the two-dimensional space of the display.

However, as displays representing a three-dimensional space come into wide use, a technology for moving icons in a three-dimensional space is required.

SUMMARY OF THE INVENTION

The present invention provides a method and an apparatus for interfacing, which support rotation of objects.

According to an aspect of the present invention, there is provided a method of interfacing. The method includes outputting at least one object to a display embodying a three-dimensional space and determining a radius of rotation of the at least one object, based on a distance between the at least one object and a rotation axis in the three-dimensional space. The method further includes controlling the at least one object to rotate around the rotation axis based on the radius of rotation when a rotation command for the at least one object is received.

According to another aspect of the present invention, there is provided a method of interfacing. The method includes outputting a first screen including a superordinate object to which a plurality of subordinate objects belong and outputting the plurality of subordinate objects to the first screen when a dragging input for the superordinate object is detected. The method further includes adjusting a disposition interval between the plurality of subordinate objects in the first screen depending on a length of the dragging input, while the dragging input is being maintained and outputting a second screen in which the disposition interval between the plurality of the subordinate objects is adjusted to a predetermined length, if a length of the dragging input is over a critical value when the dragging input is ended.

According to another aspect of the present invention, there is provided a method of interfacing including sensing a touch input, determining whether an object exists at a first coordinate where the touch input is sensed and, when the object exists at the first coordinate where the touch input is sensed, moving the object from the first coordinate to a second coordinate apart from the first coordinates by a predetermined distance.

According to another aspect of the present invention, there is provided an interface apparatus. The interface apparatus includes an output unit for outputting at least one object to a display embodying a three-dimensional space and a determining unit for determining a radius of rotation for the at least one object based on a distance between the at least one object and a rotation axis in the three-dimensional space. The interface apparatus further includes a control unit for controlling the at least one object to rotate the at least one object around the rotation axis based on the radius of rotation when a rotation command for the at least one object is received.

According to another aspect of the present invention, there is provided an interface apparatus including an output unit for outputting a first screen including a superordinate object to which a plurality of subordinate objects belong. The interface apparatus further includes an output control unit for outputting the plurality of subordinate objects to the first screen when a dragging input for the superordinate object is detected and an interval control unit for controlling a disposition interval between the plurality of subordinate objects in the first screen, depending on a length of the dragging input, while the dragging input is being maintained. The interface apparatus further includes a screen control unit for controlling the output unit so that a second screen in which the disposition interval between the plurality of the subordinate objects is adjusted to a predetermined length is output.

According to another aspect of the present invention, there is provided an interface apparatus including an input sensing unit for sensing a touch input. The interface apparatus further includes a determining unit for determining whether an object exists at a first coordinate where the touch input is sensed and a movement unit for moving the object from the first coordinate to a second coordinate apart from the first coordinate by a predetermined distance, when the object exists at the first coordinate where the touch input is sensed.

BRIEF DESCRIPTION OF THE DRAWINGS

The above and other features and advantages of the present invention will become more apparent from the following detailed description describing exemplary embodiments thereof with reference to the attached drawings in which:

FIGS. 2A and 2B illustrate screens to which an object is output, according to an embodiment of the present invention;

FIGS. 3A through 3C illustrate examples of an operation of rotating an object according to an embodiment of the present invention;

FIGS. 9A through 9C illustrate examples in which a superordinate object is generated in an interface apparatus according to an embodiment of the present invention;

FIGS. 11A and 11B illustrate examples in which a group is divided in an interface apparatus according to an embodiment of the present invention;

FIGS. 14A through 14D illustrate examples of a movement of an object using an interface apparatus according to an embodiment of the present invention.

DETAILED DESCRIPTION OF EMBODIMENTS OF THE INVENTION

Figure 1:
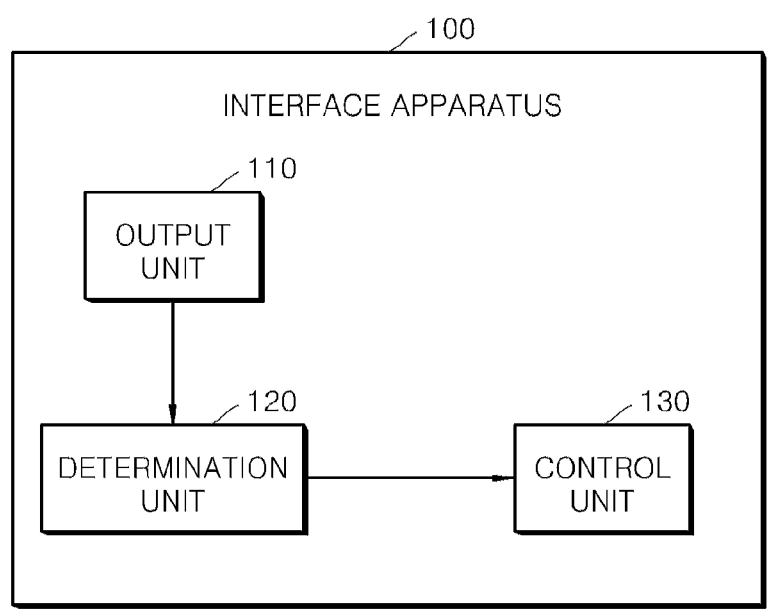
FIG. 1 is a block diagram of an interface apparatus according to an embodiment of the present invention.

Hereinafter, embodiments of the present invention will be described in detail with reference to the accompanying drawings. Like reference numerals in the drawings denote like elements described herein.

FIG. 1 illustrates a block diagram of an interface apparatus 100 according to an embodiment of the present invention.

Referring to FIG. 1, the interface apparatus 100 includes an output unit 110, a determination unit 120, and a control unit 130.

The output unit 110 outputs at least one object to a display device (not shown) embodying a three-dimensional space. In the present specification, the object is a general term for targets that a user may select. The object may be an icon, a window, or a link. In particular, the object may represent a group including one or more objects. In the present specification, an object representing a group including one or more objects is referred to as a superordinate object, and objects included in the group are also referred to as a subordinate object.

The display device embodies a three-dimensional space by a single plane and one or more planes perpendicular to the single plane. The three-dimensional space may be embodied by a rectangular (i.e. cubic) coordinate system, a spherical coordinate system, or a cylindrical coordinate system. If the display device uses the rectangular coordinate system, the three-dimensional space may be embodied by an X-axis parallel to a horizontal direction of the display device, a Y-axis parallel to a vertical direction of the display device, and a Z-axis parallel to a depth direction of the display device. The display device may represent the coordinate of an object on the Z-axis by a perspective projection method. That is, a size of the object is controlled depending on the Z coordinate of the object. Accordingly, sizes of objects located at the same coordinates on the Z-axis are the same, but sizes of objects located at different coordinates on the Z-axis are different from each other.

The output unit 110 determines the three-dimensional coordinates for at least one object and then outputs the at least one object to corresponding coordinates of the display device.

The determination unit 120 determines a radius of rotation for the object. The determination unit 120 determines the radius of rotation for the object based on a distance between the object and an axis of rotation in the three-dimensional space.

A plurality of objects may rotate around different rotation axes from each other, but, in the present specification, all of the objects rotate around the same rotation axis. The rotation axis is fixed to the X-axis (or an axis parallel to the X-axis) or the Y-axis (or an axis parallel to the Y-axis), or may be changed depending upon the user's option. For example, the Y-axis (or an axis parallel to the Y-axis) is set as the rotation axis when the user is holding the display device so that the X-axis faces downward, and the X-axis (or an axis parallel to the X-axis) is determined as the rotation axis when the user is holding the display device so that the Y-axis faces downward.

Generally, the user may change a location of an object in interface apparatuses. If the user may freely change the location of the object, it is unlikely that all of output objects are located apart at the same distance from the rotation axis. Accordingly, the determination unit 120 calculates a distance from the rotation axis to each of the output objects, and determines a radius of rotation for each of the objects based on a calculated distance. However, if the user cannot freely change the location of the object, the distance between the rotation axis and each of the output objects may be a fixed value or be selected from among more fixed values In this case, the determination unit 120 determines the radius of rotation for each of the objects from among predetermined radiuses of rotation without calculating the distance between the rotation axis and each of the output objects.

The control unit 130 controls an object so as to be rotated around the rotation axis based on the radius of rotation when a rotation command for the object is received. If objects have different radiuses of rotation from each other, the objects will rotate according to different rotation paths from each other. The control unit 130 may control the output unit 110 so that rotation speeds of the objects are different from each other according to the radius of rotation in order to make objects, of which radiuses of rotation are different from each other, rotate by the same angle for the same time.

A touch input that is recognized as the rotation command for the object may have various settings according to alternative embodiments. For example, operations of the control unit 130 depending on a control of the user are described below, assuming that the rotation command is a signal generated when dragging is performed on the display device including a touch pad by using a touch tool such as a touch pen or fingers.

The control unit 130 determines one of the rotation axis, a rotation direction, and a rotation speed (or a rotation amount) when the rotation command is received. The control unit determines the rotation axis according to a direction of a drag input. For example, when the user performs dragging on the display device along the X-axis direction, i.e., the horizontal direction, the Y-axis, i.e., the vertical direction, is determined as the rotation axis. On the other hand, when the user performs dragging on the display device along the Y-axis direction, the X-axis is determined as the rotation axis. According to alternative embodiments, the rotation axis may be determined regardless of a direction of a dragging input.

The control unit 130 determines the rotation direction of the object based on a direction of a dragging input. For example, when the user performs dragging on the display device from left to right, the control unit 130 controls the object so as to be rotated in a counterclockwise direction. In addition, when the user performs dragging on the display device from right to left, the control unit 130 controls the object so as to be rotated in a clockwise direction.

In addition, the control unit 130 may determine a speed (or a rotation amount) of the object based on a speed (or a length) of a dragging input. In a preferred embodiment, the faster the user performs dragging on the display device, the faster the object may rotate or the larger the rotation amount may be. In another embodiment, the longer a length of the dragging is, the faster the object may rotate or the larger the rotation amount may be. The length of the dragging refers to an extent by which the user drags the touch tool on the display device, and is calculated using a difference in distance between a point where the tool initially touches the display device and a point where contact between the tool and the display device is terminated.

In the above example, the case where a dragging input is recognized as the rotation command has been described. If a dragging input is recognized as a planar movement input, the object is moved in response to the dragging input. For example, if the user performs dragging on the display device by touching an object, the control unit 130 recognizes the dragging input as the planer movement command for the object and then moves the object. In this case, the Z coordinate of the objects is not changed.

In a further embodiment, the control unit 130 may control the output 110 so that the object is continuously rotated even after the dragging input or rotation command is ended. The control unit 130 determines a speed when the object continuously rotates, either based on an average speed of the dragging input or regardless of the average speed of the dragging input. In another embodiment, when the dragging input is ended, the control unit 110 controls the output unit 110 so that a location of the object is fixed. If a standby state in which the location of the object is fixed continues over a critical time period, the control unit 130 may control the output unit 110 so that the object continuously rotates based on a direction of a final dragging input. In another embodiment, the user may set (or change) whether or not to continuously rotate the object after the end of the dragging input, and may set (or change) a condition such as a rotation speed.

The control unit 130 may set the rotation speed of the object differently depending on a frequency by which the user selects the object. For example, the control unit 130 may increase the rotation speed when the object is located at a negative coordinate (a location far from the screen) on the Z-axis and may reduce the rotation speed when the object is located at a positive coordinate on the Z-axis, so that an object selected frequently by the user may frequently remain at positive coordinates (a location near to a screen) on the Z-axis.

According to a further embodiment, the control unit 130 may control the output unit 110 so that a frequency in which the user selects the object is shown by the object. Specifically, the control unit 130 may represent the frequency of the user's selecting the object through a specific color tone or a specific mark.

The control unit 130 may generate a shape of a superordinate object by combining shapes of one or more subordinate objects, and may perform a control operation to indicate the number of the subordinate objects on one side of the superordinate object.

FIGS. 2A and 2B illustrate screens to which the object is output, according to an embodiment of the present invention.

FIG. 2A illustrates an arrangement in which the objects are disposed in a three-dimensional virtual space 210, and FIG. 2B is a screen 220 on which the virtual space 210 is projected on the display device.

Objects 202 through 204 are disposed in a three-dimensional space and fast execution icons 201 are included in the screen 220 illustrated in FIG. 2B. The fast execution icons 201 may be registered, deleted, and changed by the user, if necessary Coordinates of the objects 202 through 204 on the Z-axis are represented by a perspective projection method. That is, as the objects 202 through 204 are farther from the screen 220 along the Z-axis, the sizes of the objects 202 through 204 are smaller. In FIG. 2B, a first object 202 is nearest to the screen 220, and a third object 204 is farthest from the screen 220, while a second object 203 is between the first object 202 and the third object 204.

FIGS. 3A through 3C illustrate examples of an operation of rotating an object according to an embodiment of the present invention.

A first object 301 and a second object 302 are displayed in a first screen 310, as illustrated in FIG. 3A. In FIG. 3A, the first and second objects 301 and 302, respectively, rotate in a counterclockwise direction when the user performs dragging on the screen 310 from left to right, and rotate in a clockwise direction when the user performs dragging on the screen 310 from right to left. The first and second objects 301 and 302 rotate around a rotation axis 316 which penetrates a center point 315 and is parallel to the Y-axis. A distance between the first object 301 and the rotation axis 316 is shorter than a distance between the second object 302 and the rotation axis 316. Accordingly, a radius of rotation of the first object 301 is smaller than that of the second object 302. Rotation paths of the first and second objects 301 and 302 are different from each other because radiuses of rotation of the first and second objects 301 and 302 are different from each other.

Although not illustrated in FIG. 3A, when the user performs dragging on the first screen 310 from top to bottom, the objects 301 and 302 preferably rotate in the counterclockwise direction around a rotation axis parallel to the width of the first screen 310. When the user performs dragging on the first screen 310 from bottom to top, the objects 301 and 302 rotate in the clockwise direction around the rotation axis parallel to the width of the first screen 310.

According to further embodiments, transparency is controlled so that fast execution icons 319 become transparent when the objects 301 and 302 rotate. By making unrelated items transparent when the objects 301 and 302 rotate, rotation spaces of the objects 301 and 302 may be secured and user's handling may be easy. When rotation of the objects 301 and 302 ends, the fast execution icons 319 are restored to their non-transparent original state.

FIG. 3B is a second screen 320 illustrating an embodiment where the user performs dragging on the first screen 310 from left to right. Depending on a dragging direction, the first object 301 and the second object 302 rotate around the rotation axis 316 in the counterclockwise direction.

Referring to the second screen 320, the first object 301 and the second object 320 are moved farther from the locations illustrated in FIG. 3A in a depth direction of the second screen 320. Accordingly, the sizes of the first and second objects 301 and 302, respectively, in the second screen 320 are smaller than those of the first and second objects 301 and 302 in the first screen 310.

FIG. 3C is a third screen 330 illustrating an embodiment where the user performs dragging on the second screen 320 from left to right. Depending on a dragging direction, the first object 301 and the second object 302 further rotate around the rotation axis 316 in the counterclockwise direction.

Figure 4:
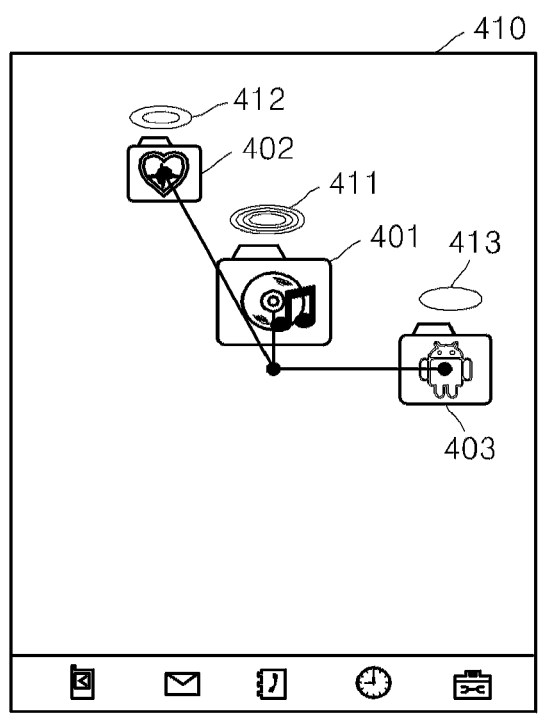
FIG. 4 is an example of an operation of indicating a frequency of selecting an object through an interface according to an embodiment of the present invention.

Referring to FIG. 3C, the first object 301 is closer to the third screen 330 due to the rotation, and the second object 302 is farther from the third screen 330. Accordingly, the size of the first object 301 in the third screen 330 is smaller than that of the first object 301 in the second screen 320, and the size of the second object 302 in the third screen 330 is larger than that of the second object 302 in the second screen 320. FIG. 4 is an example of an operation indicating a frequency of selecting an object through an interface according to an embodiment of the present invention.

Three objects 401, 402, and 403 are output on a screen 410. Bands 411, 412, and 413 are output over the objects 401, 402, and 403 respectively to indicate a frequency with which the user selects a corresponding object. Preferably, the number bands is increased in proportion to the frequency with which the user selects the corresponding object.

Referring to FIG. 4, the first object 401 is one selected most frequently by the user and the third object 403 is one selected least frequently by the user, as represented by the decreasing number of bands 411, 412 and 413. In FIG. 4, the frequency of selection is indicated by outputting a specific mark at one side of the object. However, in alternative embodiments, a color of the object may be changed depending on the frequency of selection, or a selection ranking may be output together with the object. In this manner, the user may easily select a required object by outputting a mark by which the frequency of selection is intuitively recognized at one side of the object.

Figure 5A:
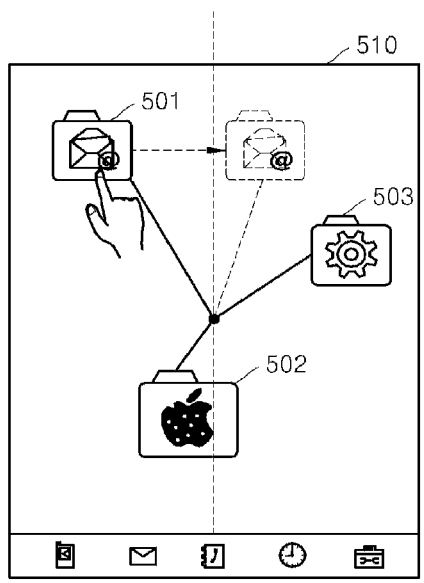
FIGS. 5A and 5B illustrate examples of an operation of moving objects through an interface according to an embodiment of the present invention.
Figure 5B:
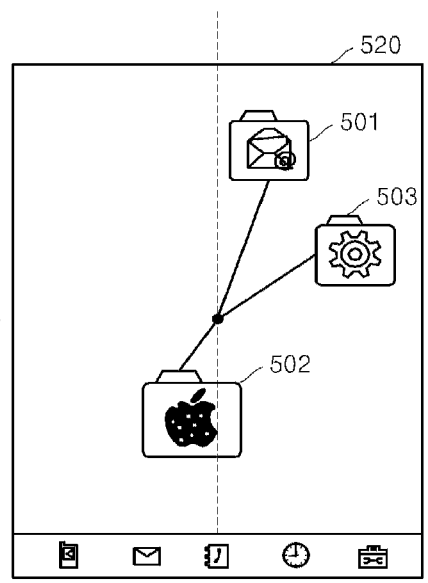

FIGS. 5A and 5B illustrate examples of an operation of moving the objects through an interface according to an embodiment of the present invention.

First through third objects 501, 502, and 503 are included in a first screen 510, as illustrated in FIG. 5A. To move the first object 501, the user touches the first object 501, drags the first object 501 to a required location, and then ends the touch. In alternative embodiments, the first object 501 is moved where the user selects the first object 501 by double clicking the first object 501 and then drags the first object 501 to a required location. The objects 501, 502, and 503 may rotate around the rotation axis if the user drags the first object 501 after simply touching the first object 501.

A second screen 520 illustrated in FIG. 5B is a screen in which a location of the first object 501 is changed. In the second screen 520, the first object 501 is disposed at a location where dragging of the user is ended. In FIGS. 5A and 5B, the user may change only the coordinates on the X-axis and Y-axis of the object by dragging corresponding to a movement command. If the user wants to change the Z-coordinate of the object, the user may rotate the object by dragging (for example, dragging to a space where there is no object) corresponding to a rotation command.

Figure 6:
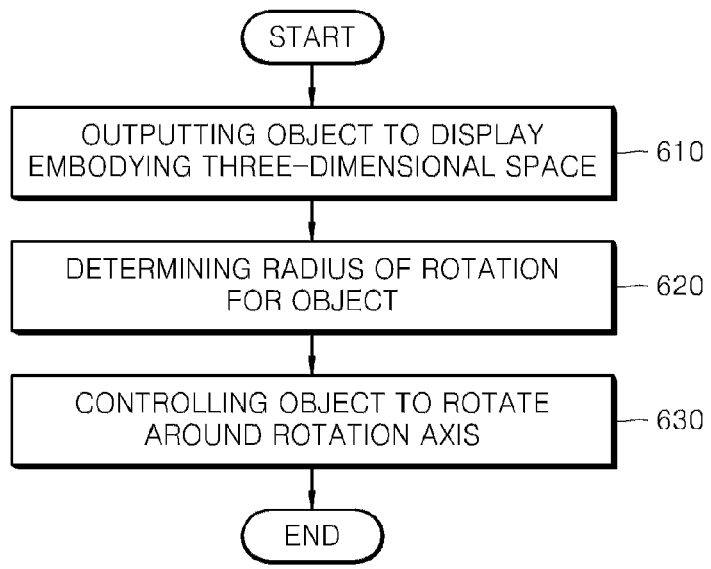
FIG. 6 is a flowchart illustrating a method of interfacing according to an embodiment of the present invention.

FIG. 6 is a flowchart illustrating a method of interfacing according to an embodiment of the present invention.

In step 610, at least one object is output to a display embodying a three-dimensional space.

In step 620, a radius of rotation for the at least one object is determined based on a distance between the at least one object and a rotation axis in the three-dimensional space.

In step 630, when a rotation command for the at least one object is received, the at least one object is controlled so as to rotate around a rotation axis based on the radius of rotation.

Figure 7:
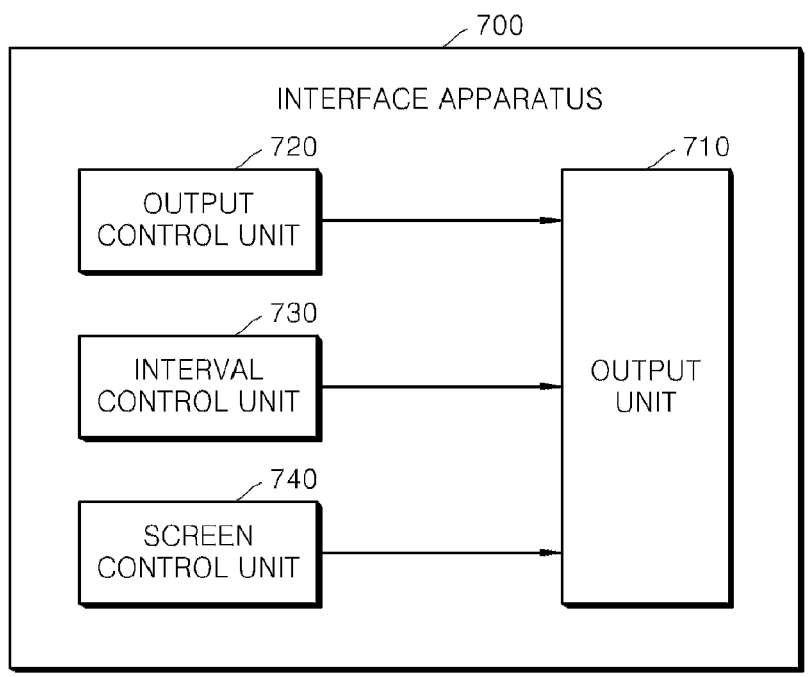
FIG. 7 is a block diagram of an interface apparatus according to an embodiment of the present invention.

FIG. 7 is a block diagram of an interface apparatus 700 according to another embodiment of the present invention.

The interface apparatus 700 includes an output unit 710, an output control unit 720, an interval control unit 730, and a screen control unit 740.

The output unit 710 outputs a first screen in which at least one superordinate object is included. The superordinate object, as stated above, is an object including at least one subordinate object and represents a group to which the at least one subordinate object belongs.

The output control unit 720 controls the output unit 710 so that a plurality of subordinate objects are output to the first screen when a dragging input for the superordinate object is detected. The plurality of subordinate objects may be output to overlap the superordinate object.

When a dragging input is maintained, the interval control unit 730 controls a disposition interval between the plurality of subordinate objects depending on a length of the dragging input. Specifically, the disposition interval between the plurality of subordinate objects is increased in proportion to a length of the dragging input. The screen control unit 740 controls the output unit 710 so that a second screen in which the disposition interval between the plurality of the subordinate objects is adjusted to a predetermined length is output, if a length of the dragging input when the dragging input is ended is over a critical value. If a length of the dragging input when the dragging input is ended is over the critical value, it may be determined that the user wants to output a new screen in which the subordinate objects are included. In this case, the screen control unit 740 controls the output unit 710 so that a new screen in which the subordinate objects are included is output. On the other hand, if a length the dragging input when the dragging input is ended is under a critical value, the output control unit 720 controls the output unit 710 so that the plurality of the subordinate objects are not output in the first screen. If a group change request signal is received from the user in a state where the second screen is output, a plurality of objects included in a previous group or a following group are output. The group change request signal may be generated when the user performs dragging in the second screen in an area. In particular, subordinate objects included in the following group may be output when the user performs dragging on the second screen from left to right, and subordinate objects included in the previous group may be output when the user performs dragging on the second screen from right to left.

In an embodiment of the present invention, the second screen is not output in all the cases where the user drags the superordinate object but only in the case where a predetermined condition is satisfied. Accordingly, when the user does not want to output a new screen but to only confirm what the subordinate object is, the user may easily confirm items of the subordinate objects in the current screen.

The interface apparatus 700 may further include a group setting unit (not shown). The group setting unit generates a new group based on an input of the user or may divide one group into two or more groups.

When the user drags one object to approach another object, the group setting unit outputs a question window inquiring whether or not to generate a new group including adjacent objects. When the user instructs so as to generate a new group, the group setting unit generates a new group including two objects and a superordinate object indicating a generated group. According to alternative embodiments, the group setting unit may also generate a new group only in the case where the user makes a plurality of objects approach each other through a multi-touch.

When a touch input is received to divide a screen to which a plurality of subordinate objects are output into one or more regions, the group setting unit may generate a plurality of groups by grouping objects included in each of the regions as one group.

Generation and division of a group are illustrated by FIGS. 10 and 11.

If a new group is generated or one group is divided into two or more groups, the group setting unit generates a superordinate object indicating these groups.

Three methods in which the group setting unit generates an image of a superordinate object are described below, but the present invention is not limited thereto.

In a first method, the group setting unit may generate the image of the superordinate object by overlapping images of subordinate objects included in a group. The image of the superordinate object may be generated by allocating a memory for a space corresponding to an image size of an object and accumulating an image of at least one subordinate object. The generated image of the superordinate object is stored in a non-volatile memory, and may be used until an attribute of the group (for example, types of the subordinate objects) is changed. This method of generating an image of the object is economical because it is not necessary to independently render images of the subordinate objects.

In a second method, the group setting unit determines an image of one of the subordinate objects belonging to a group, and sets the image as an image of the superordinate object. For example, the group setting unit may determine an image of an object which the user selects most frequently from among the subordinate objects belonging to a group, and set the image as an image of the superordinate object representing the group.

In a third method, the group setting unit generates a new image independent of images of the subordinate objects belonging to a group, as an image of the superordinate object.

Figure 8C:
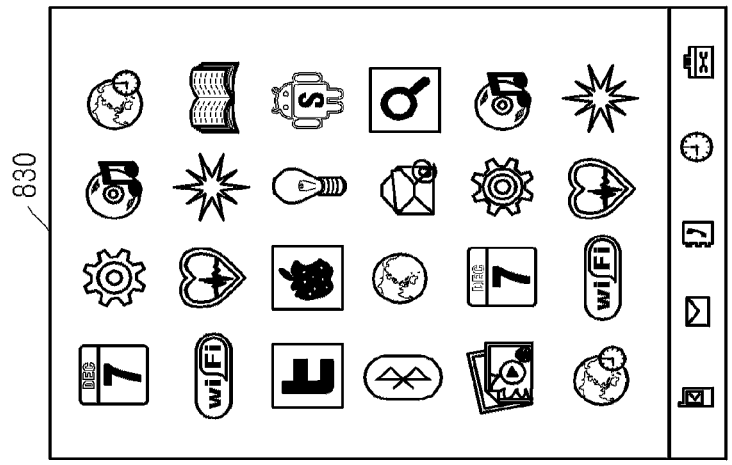
FIGS. 8A through 8C illustrate examples of a case where a user drags a superordinate object in an interface apparatus according to an embodiment of the present invention.
Figure 8B:
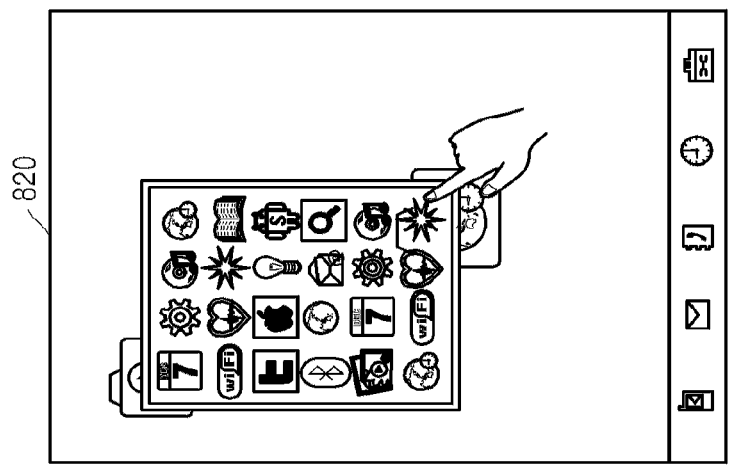
Figure 8A:
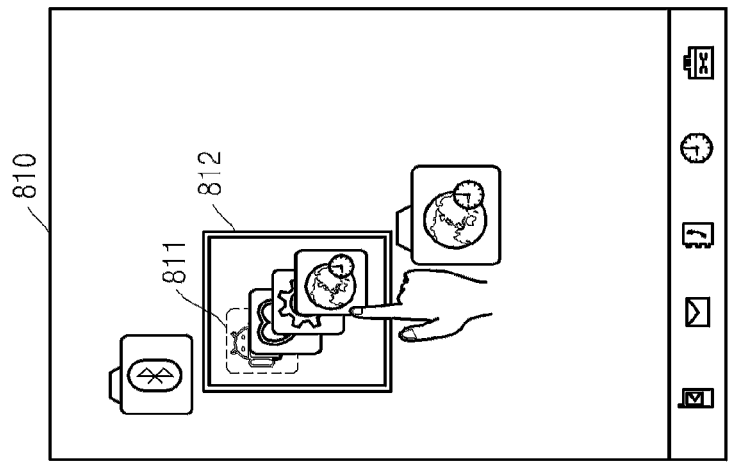

FIGS. 8A through 8C illustrate examples of an embodiment where the user drags a superordinate object in the interface apparatus 700.

FIG. 8A illustrates a screen 810 when the user starts dragging a first object 811. The first object 811 represents a group including one or more subordinate objects, as a superordinate object. When the user starts dragging the first object 811, subordinate objects 812 included in the first object 811 are displayed overlapping the first object 811.

FIG. 8B illustrates a screen 820 when the user continues the dragging. As the dragging becomes longer, the intervals between the subordinate objects 812 become wider. Similarly, if the length of the dragging is reduced, the disposition intervals between the subordinate objects 812 become smaller.

FIG. 8C illustrates a screen 830 when the user ends the dragging. In this case, a new screen 830 is output or a screen 810 in which the subordinate objects 812 are not displayed is output, based on a length of the dragging when the dragging is terminated. In FIG. 8C, it is assumed that a length of the dragging when the dragging is terminated is over a critical value, and thus, a new screen 830 including subordinate objects 812 is output.

FIGS. 9A through 9C illustrate examples in which a superordinate object 910 is generated in the interface apparatus 700 according to an embodiment of the present invention.

In FIG. 9A, a group setting unit (not shown) generates an image of the superordinate object 910 by overlapping images of subordinate objects 901, 902, and 903 belonging to a group.

In FIG. 9B, the group setting unit (not shown) determines an image of a first subordinate object 901 of the subordinate objects 901, 902, and 903 belonging to a group, as an image of the superordinate object 920.

In FIG. 9C, the group setting unit (not shown) generates a new image independent of images of the subordinate objects 901, 902, and 903, as an image of the superordinate object 930.

Figure 10A:
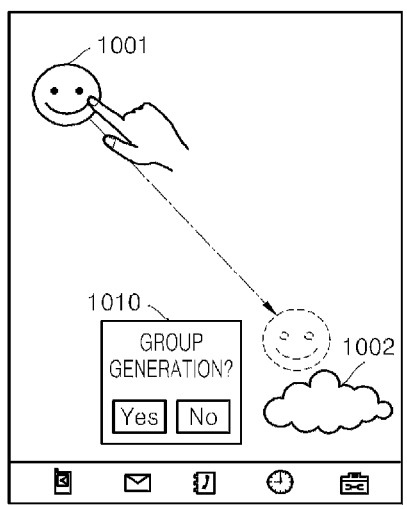
FIGS. 10A and 10B illustrate examples in which a superordinate object representing a new group is generated in an interface apparatus according to an embodiment of the present invention.
Figure 10B:
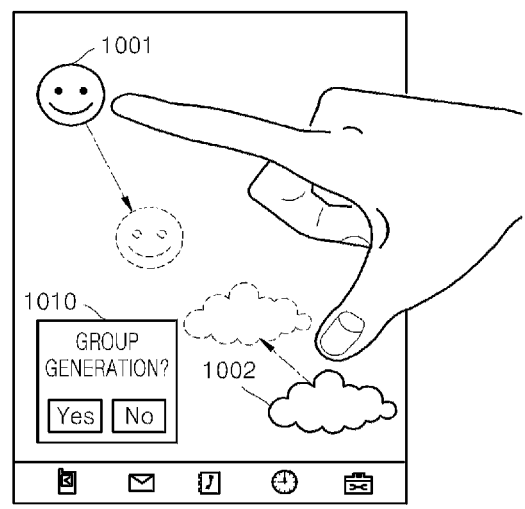

FIGS. 10A and 10B illustrate examples in which a superordinate object representing a new group is generated in the interface apparatus 700 according to an embodiment of the present invention.

In FIG. 10A, the user drags a first object 1001 to move it to a neighborhood, or vicinity, of a second object 1002. When the user ends the dragging, a group generating unit (not shown) outputs a question window 1010 inquiring whether or not to generate a new group including the first object 1001 and the second object 1002.

If the user selects "Yes", a third object including the first object 1001 and the second object 1002 is generated. The third object represents a group including the first object 1001 and the second object 1002 as a superordinate object.

If the user selects "No", a new group is not generated and the first object 1001 is output at a location where the dragging is ended.

In FIG. 10B, the user multi-touches the first object 1001 and the second object 1002 and then drags them so as to be adjacent to each other. When the user ends the dragging, the group generating unit (not shown) outputs a question window 1010 inquiring whether or not to generate a new group including the first object 1001 and the second object 1002.

After the question window 1010 is output, an operation in FIG. 10B is the same as that explained with regard FIG. 10A, above.

FIGS. 11A and 11B illustrate examples in which a group is divided in the interface apparatus 700 according to an embodiment of the present invention.

In FIG. 11A, the user touches a first coordinate 1101 with the index finger of the left hand and the index finger of the right hand, and then drags the index finger of the left hand to a second coordinate 1102 along a path 1104 of a left side and drags the index finger of the right hand to a third coordinate 1103 along a path 1105 of a right side.

As a screen is divided into three regions by the dragging, a first object 1111 and a second object 1112 are included in a first region, a third object 1113 and a fourth object 1114 are included in a second region, and a fifth object 1115 and a sixth object 1116 are included in a third region.

A group setting unit (not shown) newly generates a group including the first object 1111 and the second object 1112, a group including the third object 1113 and the fourth object 1114, and a group including the fifth object 1115 and the sixth object 1116. In addition, the group setting unit generates superordinate objects 1117, 1118 and 1119 representing the three groups, respectively.

FIG. 11B illustrates the superordinate objects 1117 through 1119 generated by the group setting unit.

Figure 12:
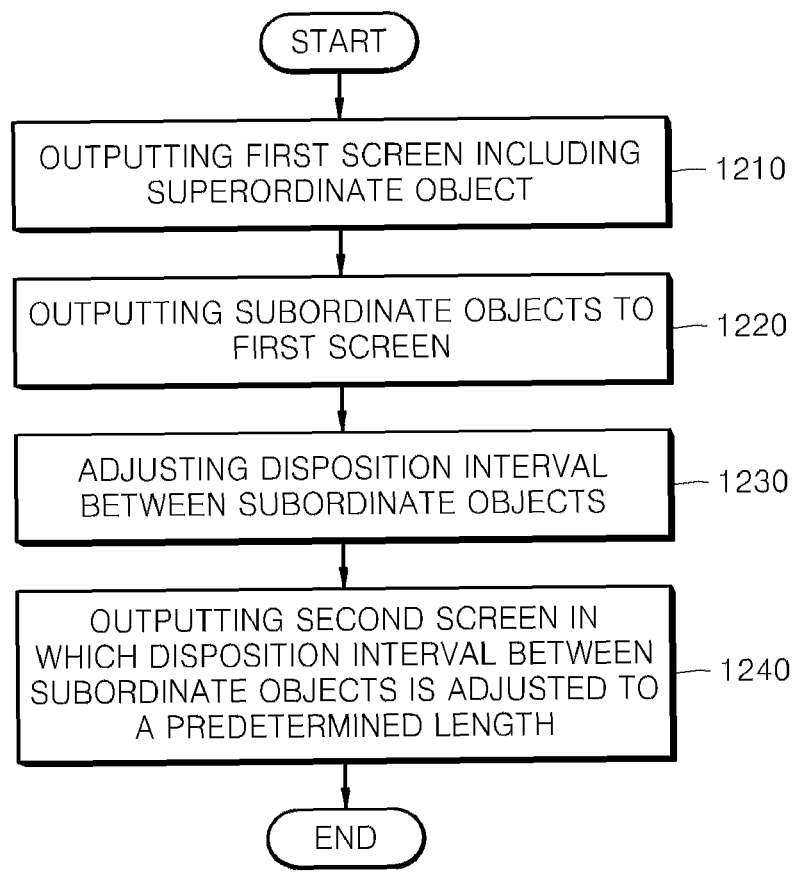
FIG. 12 is a flowchart illustrating a method of providing an interface in an interface apparatus according to an embodiment of the present invention.

FIG. 12 is a flowchart illustrating a method of providing an interface in the interface apparatus 700 according to an embodiment of the present invention.

In step 1210, a first screen including a superordinate object is output. The superordinate object, as stated above, indicates a group to which a plurality of subordinate objects belong.

In step 1220, at least one subordinate object is output in the first screen when a drag input for a superordinate object is detected.

In step 1230, when a dragging input is maintained, a disposition interval between the plurality of subordinate objects in the first screen is adjusted depending on a length of the dragging input.

In step 1240, if a length of the dragging input when the dragging input is terminated is over a critical value, a second screen in which the disposition interval between the plurality of the subordinate objects is adjusted to a predetermined length is output.

Figure 13:
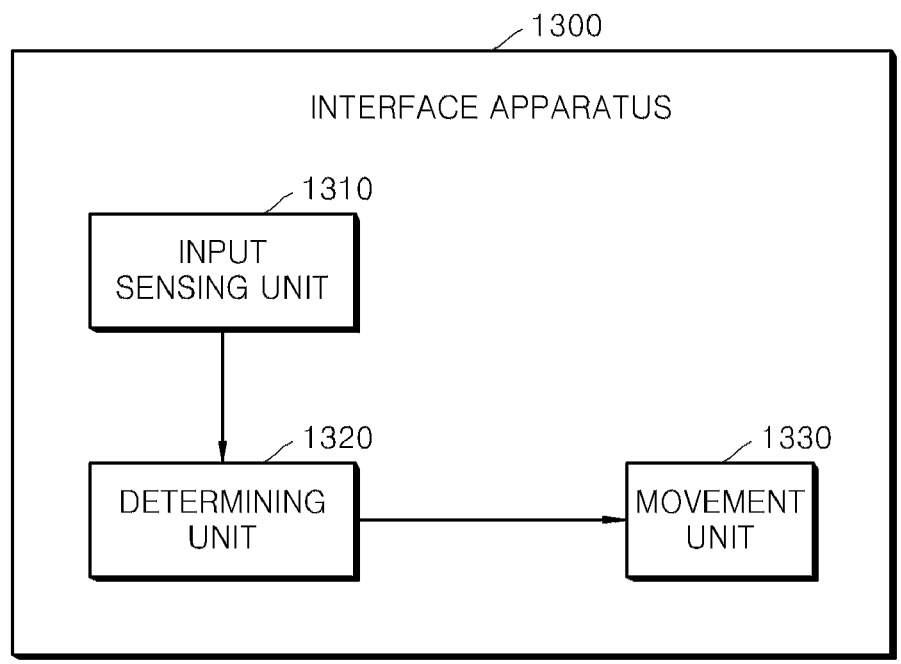
FIG. 13 is a block diagram of an interface apparatus according to an embodiment of the present invention.

FIG. 13 is a block diagram of an interface apparatus 1300 according to a further embodiment of the present invention.

The interface apparatus 1300 may include an input sensing unit 1310, a determining unit 1320, and a movement unit 1330.

The input sensing unit 1310 senses a touch input from the user. The input sensing unit 1310 may include a touch pad of an electrostatic capacity type or a decompression type.

The determining unit 1320 determines whether an object exists at a first coordinate where a touch input is sensed.

When an object exists at a first coordinate where a touch input is sensed, the movement unit 1330 moves the object to a second coordinate apart from the first coordinates by a predetermined distance. The second coordinate may be a coordinate apart from the first coordinate by a predetermined distance along the Y-axis direction (or the X-axis direction).

When a touch input is sensed and then a movement input for moving the object is sensed within a critical time, the movement unit 1330 moves the object to a third coordinate based on the movement input. On the other hand, when a touch input is sensed and then a movement input for moving the object is not sensed within a critical time, the movement unit 1330 moves the object to the first coordinate. In the conventional art, if the user touches an object to move the object, the object is covered by the palm (or a finger) of the user. In the present invention, if the user touches an object, the object may not be covered by the palm (or a finger) of the user by displaying the object apart from a touched point by a predetermined distance.

FIGS. 14A through 14D illustrate examples of a movement of an object 1410 using the interface apparatus 1300 according to an embodiment of the present invention.

Referring to FIG. 14A, the object 1410 is located at a first coordinate 1401. The user touches or double-touches the object 1410 to move the object 1410.

Referring to FIG. 14B, if the user touches the object 1410, the object 1410 moves from the first coordinate 1401 to a second coordinate 1402.

Referring to FIG. 14C, the user drags the object 1410, and thus, the object 1410 moves from the second coordinate 1402 to a third coordinate 1403.

Referring to FIG. 14D, when the user ends the touch in FIG. 14B without dragging, the object 1410 moves from the second coordinate 1402 to the first coordinate 1401.

In the present embodiment, the object 1410 moves to the first coordinate 1401, namely, an original coordinate, in the case where the user touches the object 1410 and then ends the touch without dragging. However, in another embodiment, the object 1410 may remain at the second coordinate 1402 if the user touches the object 1410 and then ends the touch without dragging.

Figure 15:
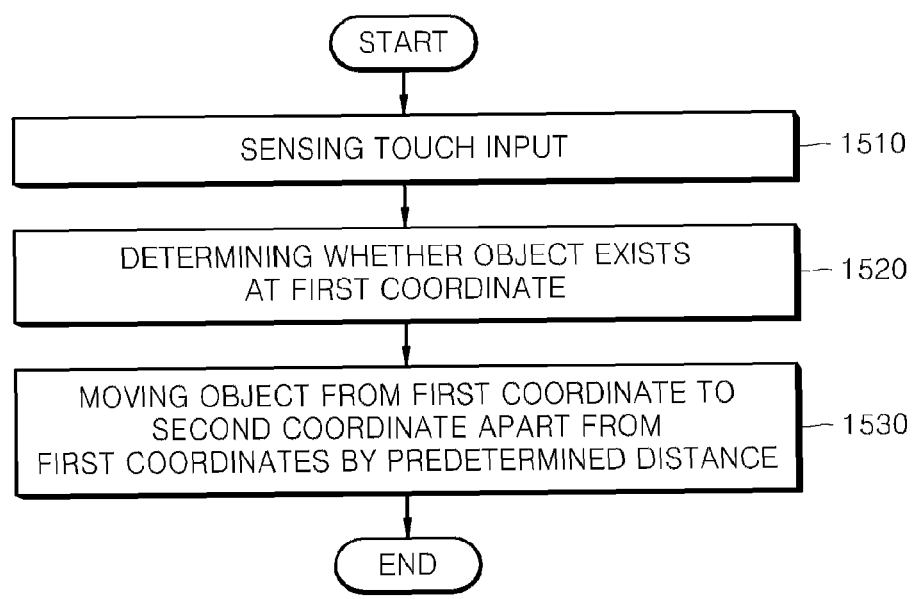
FIG. 15 is a flowchart illustrating a method of interfacing provided by an interface apparatus, according to an embodiment of the present invention.

FIG. 15 is a flowchart illustrating a method of interfacing provided by the interface apparatus 1300, according to an embodiment of the present invention.

In step 1510, a touch input is sensed.

In step 1520, it is determined whether an object exists at a first coordinate where the touch input is sensed.

In step 1530, if an object exists at the first coordinate where the touch input is sensed, the object is moved from the first coordinate to a second coordinate apart from the first coordinate by a predetermined distance.

The aforementioned embodiments of the present invention can be written as computer programs and can be implemented in general use-digital computers that execute the programs using a non-transitory computer readable recording medium. Examples of the computer readable recording medium include magnetic storage media (e.g., ROM, floppy disks, hard disks, etc.), optical recording media (e.g., CD-ROMs, or DVDs), etc.

While this invention has been particularly shown and described with reference to certain embodiments thereof, it will be understood by those skilled in the art that various changes in form and details may be made therein without departing from the spirit and scope of the invention as defined by the appended claims.

What is claimed is:

1. A method of interfacing, the method comprising:
    outputting at least one object to a display embodying a three-dimensional space;
    determining a radius of rotation of the at least one object, based on a distance between the at least one object and a rotation axis in the three-dimensional space;
    determining a rotation amount of the at least one object, based on a length of a touch input; and
    controlling the at least one object to rotate around the rotation axis based on the radius of rotation and the rotation amount when a rotation command for the at least one object is received,
    wherein controlling the at least one object comprises determining a rotation speed of the at least one object based on a frequency of selecting the at least one object.

2. The method of claim 1, wherein determining the rotation amount comprises:
    receiving the touch input for performing dragging on the display; and
    determining the rotation amount of the at least one object, based on a length of the dragging.

3. The method of claim 2, wherein controlling the at least one object further comprises controlling the at least one object to continuously rotate at a predetermined speed after the dragging is ended.

4. The method of claim 1, wherein the three-dimensional space is represented by a first axis parallel to a horizontal direction of the display, a second axis parallel to a vertical direction of the display, and a third axis parallel to a depth direction of the display.

5. The method of claim 4, wherein controlling the at least one object comprises controlling the at least one object to rotate around a rotation axis parallel to the second axis if a dragging input is received in a direction parallel to the first axis and to rotate around a rotation axis parallel to the first axis if the dragging input is received in a direction parallel to the second axis.

6. The method of claim 1, wherein outputting the at least one object comprises outputting a first object that is rotatable and a second object that is not rotatable, and
    wherein the method further comprises controlling the second object to adjust a transparency thereof while the first object is rotating.

7. The method of claim 1, wherein the at least one object comprises a superordinate object including at least one subordinate object.

8. An interface apparatus comprising:
    an output unit for outputting at least one object to a display embodying a three-dimensional space;
    a determining unit for determining a radius of rotation for the at least one object based on a distance between the at least one object and a rotation axis in the three-dimensional space; and
    a control unit for determining a rotation amount of the at least one object, based on a length of a touch input, and controlling the at least one object to rotate the at least one object around the rotation axis based on the radius of rotation and the rotation amount when a rotation command for the at least one object is received,
    wherein the control unit determines a rotation speed of the at least one object based on a frequency of selecting the at least one object.

9. A non-transitory computer-readable storage medium having recorded thereon a program for executing a method of interfacing, the method comprising:
    outputting at least one object to a display embodying a three-dimensional space;
    determining a radius of rotation of the at least one object, based on a distance between the at least one object and a rotation axis in the three-dimensional space;

determining a rotation amount of the at least one object, based on a length of a touch input; and controlling the at least one object to rotate around the rotation axis based on the radius of rotation and the rotation amount when a rotation command for the at least one object is received, wherein controlling the at least one object comprises determining a rotation speed of the at least one object based on a frequency of selecting the at least one object.

* * * * *